United States Patent [19]

Gochenour et al.

[11] Patent Number: 5,566,804
[45] Date of Patent: Oct. 22, 1996

[54] AUTOMATICALLY ADJUSTING FRICTION TORQUE DEVICE

[75] Inventors: Daniel V. Gochenour, Auburn; Barry T. Adams, St. Joe; Martin E. Kummer, Auburn; Christopher M. Davis, Albion; Steven D. Lepard, Angola; Michael L. Bassett; Kevin F. Schlosser, both of Auburn, all of Ind.

[73] Assignee: Dana Corporation, Toledo, Ohio

[21] Appl. No.: 263,315

[22] Filed: Jun. 21, 1994

[51] Int. Cl.⁶ .................................................. F16D 13/75
[52] U.S. Cl. ...................... 192/70.25; 192/70.18; 192/70.3; 192/111 A
[58] Field of Search .............................. 192/70.18, 70.25, 192/111 A, 30 W, 70.3, 89.26, 99 A

[56] References Cited

U.S. PATENT DOCUMENTS

| | | | |
|---|---|---|---|
| 2,160,752 | 5/1939 | Oliver. | |
| 3,752,286 | 8/1973 | Sink | 192/111 A |
| 3,876,049 | 4/1975 | Linn et al.. | |
| 4,207,972 | 6/1980 | Zeidler | 192/111 A |
| 4,445,600 | 5/1984 | Schmidt. | |
| 4,684,002 | 8/1987 | Takeuchi. | |
| 4,941,557 | 7/1990 | Flotow et al.. | |
| 5,069,322 | 12/1991 | Mizukami et al. | 192/70.25 |
| 5,186,286 | 2/1993 | Lindberg. | |
| 5,238,093 | 8/1993 | Campbell | 192/30 W |
| 5,320,205 | 6/1994 | Kummer et al.. | |
| 5,377,803 | 1/1995 | Link et al.. | |
| 5,404,979 | 4/1995 | Craft et al. | 192/70.25 |
| 5,431,268 | 7/1995 | Mizukami et al. | 192/70.25 |

FOREIGN PATENT DOCUMENTS

| | | | |
|---|---|---|---|
| 4412107A1 | 11/1994 | Germany. | |
| 2264989 | 9/1993 | United Kingdom | 192/111 A |
| 2284025 | 5/1995 | United Kingdom. | |

*Primary Examiner*—Richard M. Lorence
*Attorney, Agent, or Firm*—Dykema Gossett PLLC

[57] ABSTRACT

A friction device includes an adjustment mechanism for adjusting the device in response to wear on a friction surface within the device. The adjustment mechanism includes a first cam ring and a second cam ring adjacent the first cam ring. In one embodiment, the first cam ring is adapted for axial, but non-rotational movement with respect to a cover of the friction device, the cover being secured to a driving member for transmitting torque. The second cam ring is adapted for rotational movement with respect to the cover and the first cam ring. The first cam ring has a plurality of annular ramped surfaces on an axial face of the first cam ring. The second cam ring has a plurality of annular ramped surfaces on an axial face opposing the axial face of the first cam ring. The second cam ring is rotated with respect to the first cam ring such that the ramped surfaces cam against each other to increase the axial displacement of the first cam ring and the second cam ring, whereby the axial displacement is adapted to compensate for wear on a friction surface of a member of the friction device.

3 Claims, 6 Drawing Sheets

AUTOMATICALLY ADJUSTING FRICTION TORQUE DEVICE

FIELD OF THE INVENTION

This invention relates generally to a friction torque device, and more particularly to a friction torque device that automatically adjusts to compensate for wear on a friction surface within the device.

BACKGROUND OF THE INVENTION

A friction clutch or brake includes an engaging member having a friction surface that wears over the life of the device. In order for the friction torque device to continue operating effectively, the relative position of the engaging members must be adjusted or realigned to compensate for wear that occurs on the friction surface.

More specifically, in a friction clutch, torque is transmitted from a driving member to a driven member, each member rotating about an axis. The driven member is interposed between the driving member and a pressure plate. In normal operation, a release assembly cooperates with the pressure plate to selectively move the pressure plate axially towards the driven member in order to engage and disengage the clutch. As wear occurs on a friction surface of the driven member, the pressure plate must be moved an additional axial increment to engage the driven member with the driving member. The relative position of the pressure plate must therefore be compensated internally for this additional increment of movement.

With most heavy duty friction clutches, the adjustment of a release bearing and spring assembly is manually achieved in order to compensate for wear on the friction surface of the driven member. Manual adjustment, however, requires continuous monitoring to determine if adjustment is necessary, as well as manpower to perform the adjustment. If the adjustment is not timely completed, the clutch will operate less effectively.

It is also known in the art to provide a clutch with an automatic adjustment mechanism. While a number of such mechanisms do compensate for wear, numerous parts are typically required for the desired result. Further, the operative parts are frequently disposed outside the cover of the clutch, thereby subjecting the parts to possible damage and an increased likelihood of breakdown. More significantly, prior art automatic adjustment mechanisms often do not fully, or timely compensate for wear on the friction surface. This is due, in part, to incomplete adjustment, or delayed adjustment after the friction surface has worn.

It is therefore a goal of this invention to provide a friction torque device with an automatic adjustment mechanism which has a simple structure with a minimum of interconnected parts, wherein the parts are disposed within a housing or cover for the device. It is a further goal of the invention to provide an automatic adjustment mechanism that directly and effectively adjusts the friction torque device during normal operation.

SUMMARY OF THE INVENTION

A friction torque device includes an adjustment mechanism for adjusting the relative position of a release bearing and spring assembly in response to wear on a friction surface of a driven member. The friction torque device transmits torque from a driving member to the driven member, which is coupled to an axially extending driven shaft. A cover is secured to the driving member for rotation therewith. The pressure plate and driven member are sandwiched between the driving member and the cover. A release assembly extends circumferentially about the driven shaft.

The adjustment mechanism includes a first annular cam ring, and a second annular cam ring adjacent the first annular cam ring. Opposed axial faces of the cam rings include corresponding annular ramped surfaces for camming. The cam rings rotate with respect to each other for axial displacement of the cam rings. The adjustment of the clutch is automatically set each time the clutch is fully disengaged. The adjustment is a direct function of increased movement of the pressure plate due to wear on friction surfaces, which is triggered by a pin or pin assembly that cooperates with the pressure plate. The increment of wear on the friction surface of driven member is directly translated into a gap between the annular cam rings. The cam rings cam against each other to displace this gap when the clutch is fully disengaged.

In a first embodiment, the adjustment mechanism is coupled to the cover. A radially extending lever is interposed between the release assembly and the adjustment mechanism, wherein the lever pivots about an axial end of the adjustment mechanism. The lever cooperates with the axial end of the adjustment mechanism and the release assembly to move the pressure plate to engage and disengage the friction device. The axial end of the adjustment mechanism is at a first position relative to cover prior to wear on said friction surface. The lever provides a pulling force on the axial end of the adjustment mechanism to move the axial end of the adjustment mechanism to a second position relative to cover after wear has occurred on the friction surface. Such movement occurs when the clutch is fully disengaged. The first embodiment includes a pin assembly for securing the pressure plate to the cover, which allows for free axial movement of the pressure plate with respect to the cover within a limited range. The pin assembly forms an interference fit with the cover, such that a force greater than the interference fit is able to move the pin assembly with respect to the cover. Further, in order to provide a biasing force on the adjustment mechanism, a first set of straps secure the pressure plate to the cover and a second set of straps secure the adjustment mechanism to the pressure plate. The straps allow for slight axial movement, but otherwise prevent relative rotation of the members to which the straps are secured. The straps further serve to bias the lever against the pressure plate.

In a second embodiment, the adjustment mechanism is coupled to the pressure plate. An annular diaphragm spring extends radially between the release assembly and the cover, and pivots about a fulcrum on the pressure plate. The fulcrum of the pressure plate is formed on the adjustment mechanism. The first cam ring rotates with respect to the second cam ring to move the fulcrum from a first axial position with respect to the pressure plate, to a second axial position. The second axial position is spaced away from the first axial position. The first cam ring is rotated in response to wear on a friction surface of the device. The second embodiment includes a pin which allows for free axial movement of the pressure plate between the driving member and the cover within a limited range. The pin forms an interference fit with the pressure plate, such that a force greater than the interference fit is able to move the pin relative the pressure plate.

These and other features of the present invention can be best understood from the following specification and drawings, of which the following is a brief description.

DETAILED DESCRIPTION OF THE PREFERRED EMBODINENT

Figure 1:
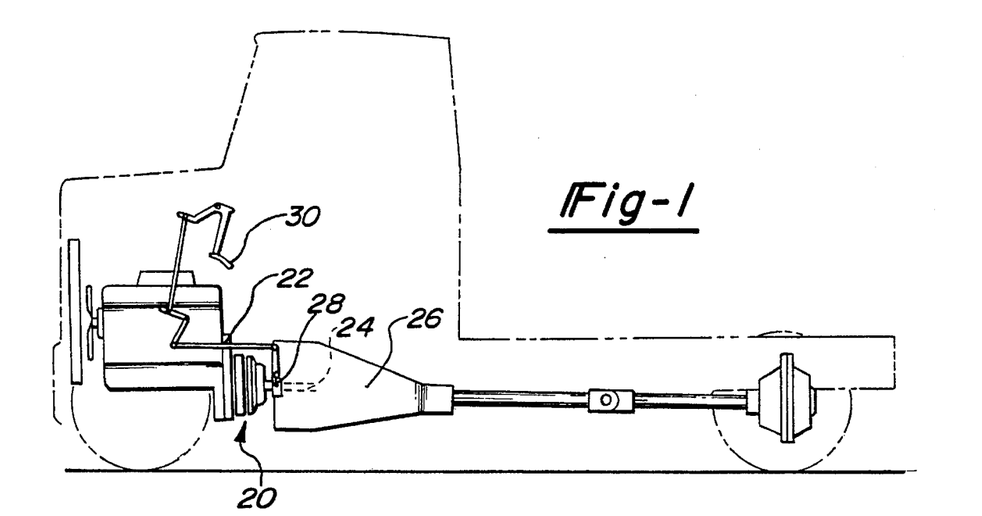
FIG. 1 is an environmental view illustrating an automatically adjusting clutch mounted in a heavy duty vehicle.

Referring now to FIG. 1, a friction torque device is shown as a heavy duty clutch 20 which selectively transmits torque from an engine flywheel 22 to a driven shaft 24 of a vehicle transmission 26. Flywheel 22 is the driving member providing torque which is selectively transmitted to the transmission. A standard clutch release assembly 28 is employed for affecting clutch disengagement from flywheel 22. Such movement of release assembly 28 is achieved by depression of a clutch pedal 30 in a vehicle cab. Clutch pedal 30 is mechanically linked to release assembly 28. A full stroke of pedal 30 will fully disengage clutch 20, moving release assembly 28 to an extreme right position.

Figure 2:
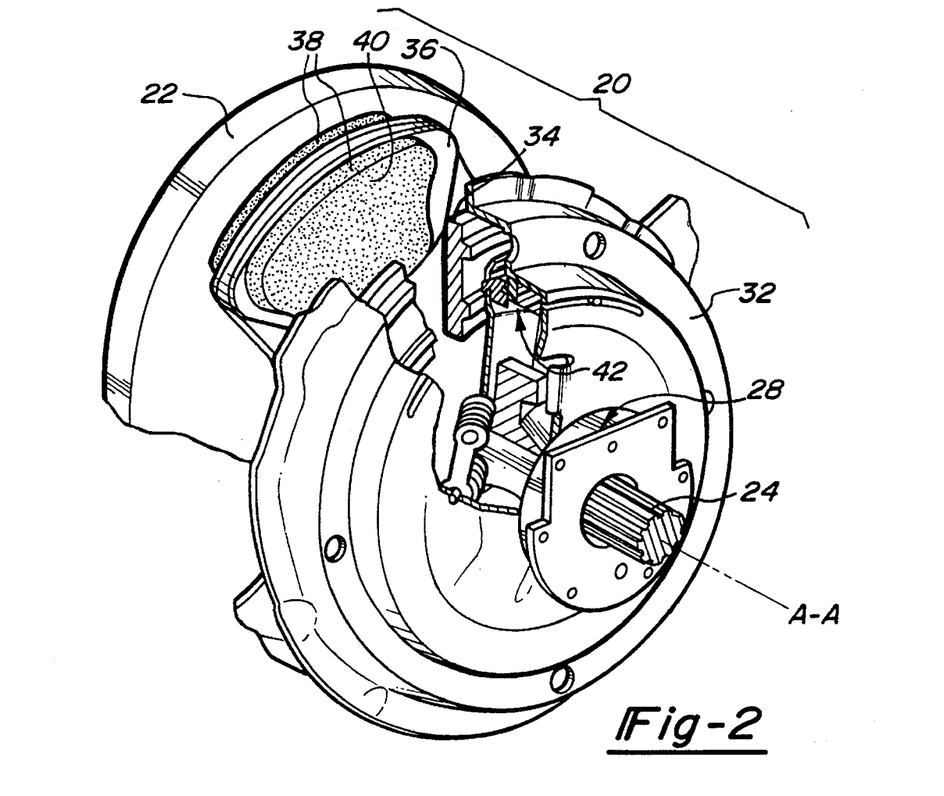
FIG. 2 is a perspective view of the automatically adjusting clutch.
Figure 3:
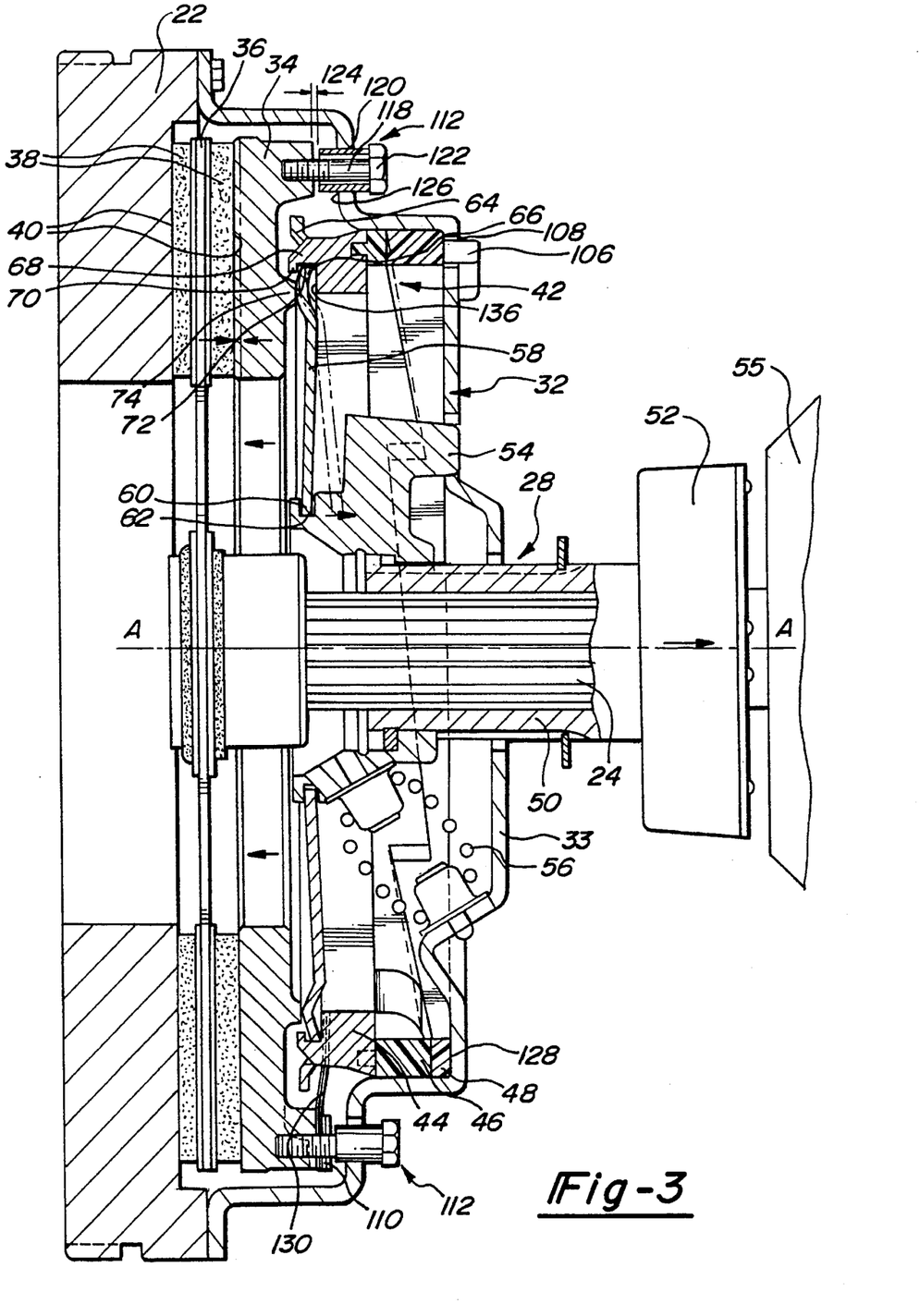
FIG. 3 is a cross-sectional view of the automatically adjusting clutch.

Referring to FIGS. 2 and 3, flywheel 22 is fixed to a cover 32 for rotation therewith. Cover 32 is in a fixed position relative to flywheel 22, and includes a radially extending wall 33 which is spaced from flywheel 22 a fixed distance. A pressure plate 34 and a driven member 36 are sandwiched between flywheel 22 and cover 32, which rotate about drive axis A—A. Driven member 36 is rotationally fixed to the axially extending driven shaft 24. As will be apparent to those skilled in the art, pressure plate 34 is selectively moved the left to frictionally engage pressure plate 34, driven member 36 and flywheel 22 to transmit torque from flywheel 22 to driven shaft 24. Driven member 36 includes a friction pad 38 on each axial side of the driven member. In FIG. 2, the relative thickness of friction pad 38 is enlarged to emphasis the effect of wear which occurs on a friction surface 40 of friction pad 38 over the life of clutch 20.

Due to the wear on friction surface 40, driven member 36 must be moved to the left an additional axial distance to engage flywheel 22. During operation of the clutch, and more specifically, when the clutch is fully disengaged, an adjustment mechanism 42 automatically adjusts the clutch to compensate for this wear.

Adjustment mechanism 42 is annular and includes an adjusting ring 44, a left cam ring 46 rigidly secured to adjusting ring 44, and a right cam ring 48 adjacent left cam ring. Adjustment ring 44, left cam ring 46 and right cam ring 48 extend about axis A—A. Adjustment mechanism 42 is mounted to cover 32 for rotational movement therewith, but is otherwise axially movable within a limited range. As will be described, right cam ring 48 is mounted for limited rotational movement with respect to adjusting ring 44, left cam ring 46, and cover 32.

Release assembly 28 includes a sleeve 50 positioned circumferentially about driven shaft 24. A pull assembly 52 is carried by sleeve 50, and secured at one end thereof. A retainer 54 is secured to the opposite end of sleeve 50, and positioned circumferentially about sleeve 50. As shown in FIG. 3, release assembly 28 contacts a transmission housing 55 when moved to an extreme right position. The transmission housing is a stop for release assembly 28, and defines the fully disengaged position of clutch 20. Transmission housing 55 is in a fixed axially spaced location with respect to flywheel 22, and permits release assembly 28 to be returned to a control location for adjustment of clutch 20. Another form of a stop could extend from cover 32 to provide a control location for axial movement of release assembly 28, the stop providing an extreme right position for the release assembly.

Coil springs 56 are interposed between cover 32 and retainer 54 forming a spring assembly. As is well known in the art, coil springs 56 urge retainer 54 to the left, or engaged position. To engage and disengage the clutch, a plurality of levers 58 are radially interposed between retainer 54 and adjustment mechanism 42. As more clearly seen in FIG. 8, a radially inner portion 60 of each lever 58 is received in a peripheral groove 62 formed in retainer 54. A radially outer portion 64 of each lever 58 has an opening 66 which receives a leftwardly projecting pivot extension 68 formed on a left face of adjusting ring 44. Pivot extension 68 is the extreme left axial end of adjustment mechanism 42. Pivot extension 68 further includes a radial lip 70 extending radially inwardly. Lip 70 assists in securing lever 58 to adjusting ring 44.

Figures 7, 8, 10:
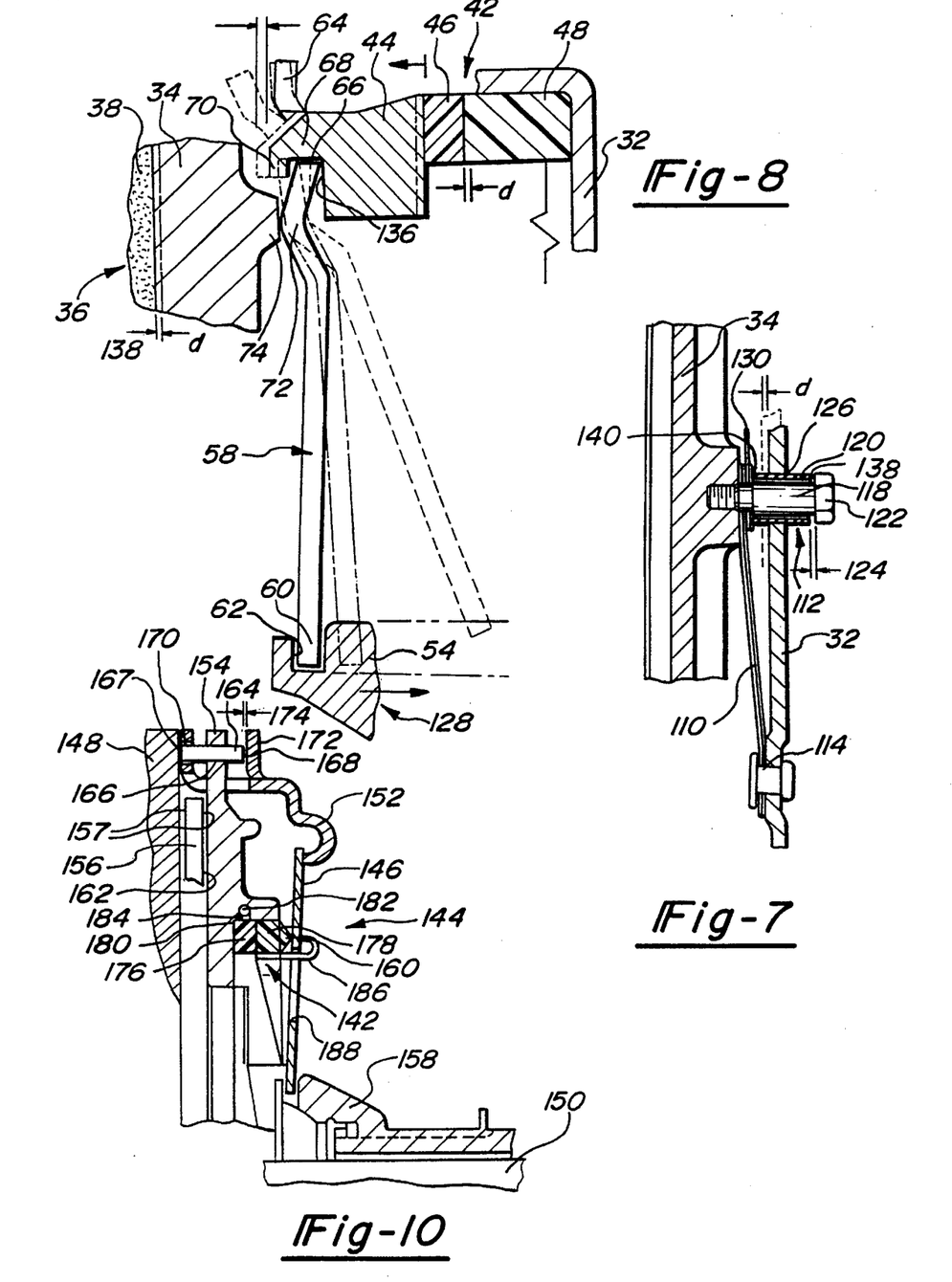
FIG. 7 is a partial radial cross-sectional view of the automatically adjusting clutch, including a connection pin assembly.
FIG. 8 is an enlarged partial cross-sectional view of a portion of the automatically adjusting clutch.
FIG. 10 an alternate embodiment of an automatically adjusting clutch.

A leftwardly extending projection 72 of lever 58 is intermediate the radially inner portion 60 and radially outer portion 64 of each lever. Projection 72 pivotally and pressingly engages an annular shoulder 74 formed on the right side of pressure plate 34. Thus, leftward movement of retainer assembly 28 causes lever 58 to apply a leftward force on pressure plate to engage the clutch members.

Figure 4:
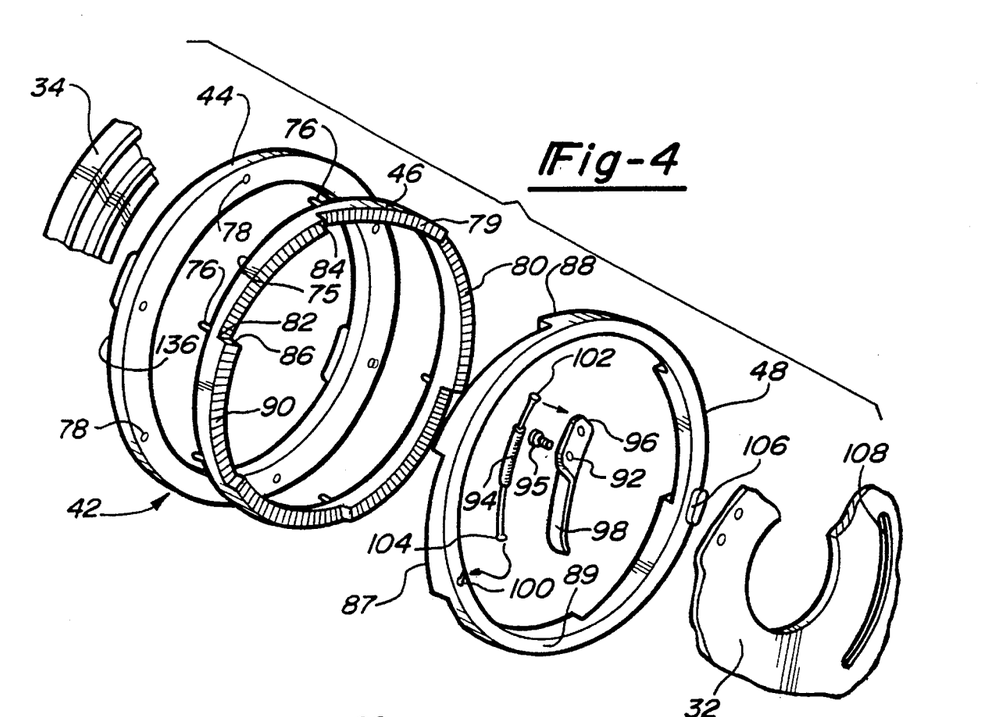
FIG. 4 an exploded perspective view of an adjustment mechanism within the clutch.
Figure 5:
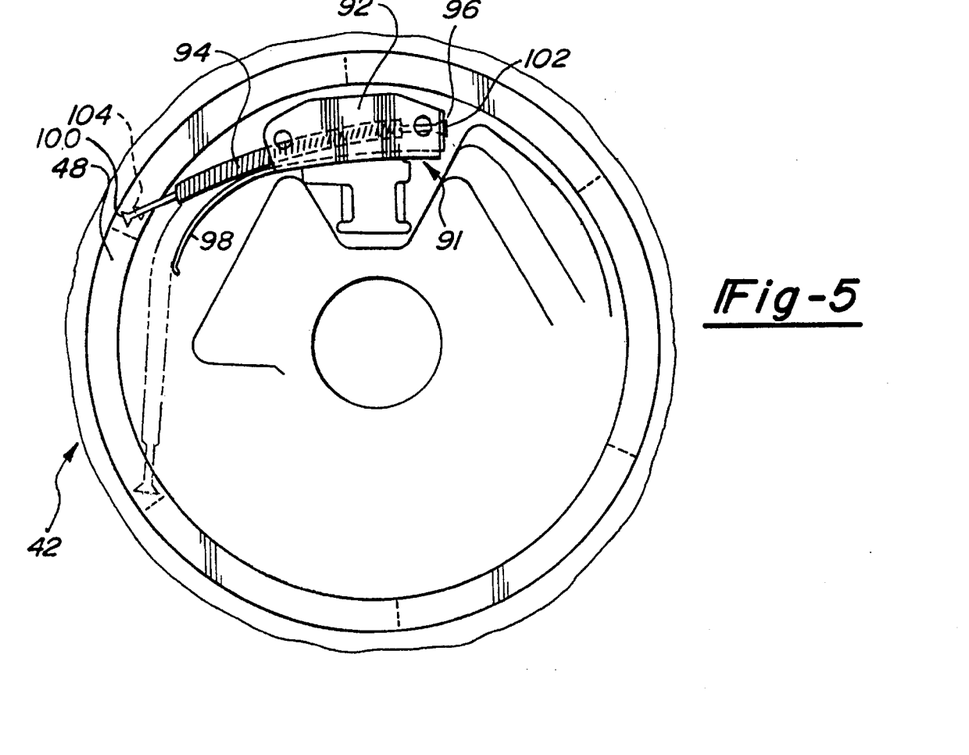
FIG. 5 is a fragmentary plan view of the adjustment mechanism.

Referring now to FIGS. 4 and 5, an axial face 75 of left cam ring 46 includes a plurality of studs 76 each extending into a corresponding aperture 78 formed in adjusting ring 44 to fixedly secure left cam ring 46 to adjusting ring. Adjusting ring 44 and left cam ring 48 are rotationally fixed to cover ring 32, but are otherwise permitted limited axial movement. In contrast, right cam ring 48 is permitted limited rotational movement with respect to cover 32.

An axial face 79 of left cam ring 46, which is opposite adjusting ring 44, includes a plurality of annular ramps 80. Ramps 80 extend the full circumferential extent of left cam ring 46. Each of the ramps 80 extends from a first axial position 82 to a second axial position 84, defining an axially extending ledge 86 in between the ramps.

An axial face 87 of right cam ring 48 includes a plurality of annular ramps 88. The opposite axial face 89 of right cam ring 48 contacts cover 32. Ramps 88 of right cam ring 48 contact ramps 80 of left cam ring 46 and are dimensioned and shaped to conform to ramps 80 for camming. Further, the contacting surfaces of ramps 80 and 88 include serrations 90. Serrations 90 assist in locking the contacting surfaces together, increasing the frictional resistance between left cam ring 46 and right cam ring 48. Therefore, a greater force is required for right cam ring 48 to rotate with respect to left cam ring 46 with serretions than without serrations. Serrations 90 may not be desired with all clutches.

Right cam ring 48 is biased to rotate with respect to cover 32 by a spring assembly 91. Spring assembly 91 includes bracket 92 and spring 94. Bracket 92 is secured to cover 32 by rivets 95. Bracket 92 includes a spring seat 96 at one circumferential end and an arm 98 at the other circumferential end. Spring 94 is received radially inward of right cam ring 48, and extends between seat 96 of bracket 92 and a notch 100 formed in right cam ring 48. Bracket 92 secures one end of spring 94, and assists in maintaining spring 94 in a curved orientation, which provides an inner radial clearance. In so doing, spring 94 may be placed in tension without interfering with other members of the clutch. Preferably, spring 94 is formed from a continuous coil, wherein each end of spring 94 are wound to flair outwardly to define a catch plate at each end of the spring. One end of spring 94 forms a first catch plate 102 which is received within seat 96 of bracket 92, and the other end of spring 94 forms a second catch plate 104, which is received within notch 100.

An indicator tab 106 extends from right cam ring 48 through a circumferentially extending slot 108 in cover 32. Indicator tab 106 indicates the amount that right cam ring 48 has rotated with respect to cover 32, thus indicating the amount of adjustment which has occurred within clutch 20. Further, indicator tab 106 may be used to re-set the adjustment mechanism 42 when friction pads 38 are replaced.

As shown in phantom in FIG. 5, counterclockwise rotation of right cam ring 48 applies a tension to spring 94. When under tension, spring 94 applies a biasing force on right cam ring 48 so that right cam ring rotates with respect to left cam ring under conditions required for adjustment. As right cam ring 48 rotates clockwise, ramps 80 and 88 cam against each other, moving adjusting ring 44 from a first axial position to a second axial position, the second axial position being spaced a greater axial distance from wall 33 of cover 32 than the first axial position. The camming thereby increases an axial displacement of left cam ring and right cam ring. The mechanism 42 is designed to stop adjusting when the clutch is fully worn. When the friction surfaces 40 are fully worn, tab 106 contacts an end of slot 108 to prevent further rotation of right cam ring 48.

Figure 6:
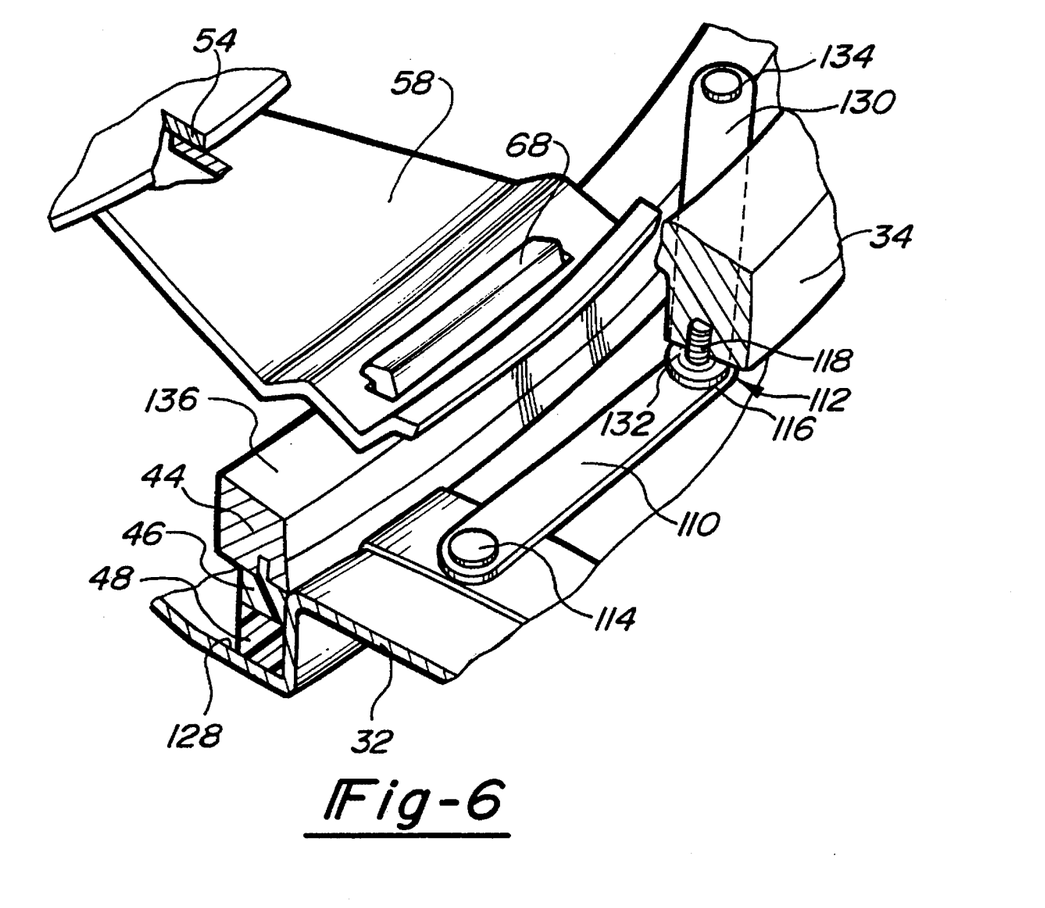
FIG. 6 is a fragmentary perspective view of the automatically adjusting clutch.

As illustrated in FIGS. 3 and 6, pressure plate 34 is attached to cover 32 by a strap 110 and a pin connection assembly 112. For convenience, although a plurality of straps 110 and pin connection assemblies 112 are circumferentially spaced about cover 32, only one set will be described. Each strap 110 extends in a generally circumferential orientation with respect to cover 32. An end 114 of strap 110 is attached to cover 32, while the other end 116 is attached to pressure plate 34 at a location spaced from end 114. Strap 110 is sufficiently flexible to allow pressure plate to be moved axially with respect to cover 32, but is otherwise sufficiently rigid to prevent rotation of pressure plate with respect to cover 32.

As more clearly seen in FIGS. 3 and 7, pin connection assembly 112 includes a pin 118 and pin housing 120. Pin 118 is threadably received in a radially outer portion of pressure plate 34. An opposite end of pin 118 includes an enlarged head 122. Pin housing 120 extends circumferentially about pin 118 between pressure plate 34 and head 122.

A slight clearance 124 is provided between pin housing 120 and head 122 of pin 118 permitting pressure plate 34 a small amount of relative movement. Pressure plate 34 is thereby freely movable an axial distance defined by clearance 124. During normal operation, clearance 124 permits sufficient axial movement of pressure plate with respect to cover 32 to engage and disengage the clutch. Pin housing 120 is received in an aperture 126 of cover 32, forming an interference fit between the outer dimension of pin housing 120 and aperture 126. Pressure plate 34 is movable an additional axial distance defined by the axial dimension of pin housing 120, assuming the force is sufficient to overcome the interference fit between pin housing 120 and cover 32.

FIG. 7 illustrates a radial cross-section of pin connection assembly 120 and strap 110. Clutch 20 is shown in the disengaged position, so clearance 124 is between head 122 of pin 118 and pin housing 120.

Referring again to FIGS. 3 and 6, adjustment mechanism 42 is seated in an annular cavity 128 formed in cover 32 and secured to cover 32 by a strap 130. For convenience, although a plurality of straps 130 are circumferentially spaced about cover 32, only one will be described. Each strap 130 extends in a generally circumferential orientation with respect to cover 32. An end 132 of strap 130 is attached to pressure plate 34 by pin 118, while the other end 134 is attached to axial face 136 of adjusting ring 44 at a location spaced from end 132. Further, end 134 of strap 130 is located radially inwardly of end 132. Strap 130 is sufficiently flexible to allow adjusting ring 44 to be moved axially with respect to cover 32 and pressure plate 34, but is otherwise sufficiently rigid to prevent rotation of adjusting ring 44 with respect to cover 32. Right cam ring 48, which is not directly secured to adjusting ring 44 or left cam ring 46, is sandwiched between cover 32 and left cam ring 44.

Strap 130 serves an additional purpose which is to bias adjusting ring 44 towards lever 58, or to the left as shown in FIG. 3. Thus, axial face 136 of adjusting ring 44 applies a leftward force on lever 58. Such force maintains lever 58 in contact with pressure plate 34. Therefore, if release assembly 28 is moved to an extreme right position, a gap will be created between left cam ring 46 and right cam ring 48, as opposed to lever 58 and pressure plate 34. The significance of this will become apparent once the interaction of lever and adjustment mechanism 42 ring is understood.

Clutch 20 is disengaged by rightward movement of release assembly 28, and more specifically, rightward movement of retainer 54. A fully disengaged position of clutch 20 is defined as the position when release assembly 28 contacts a stop, namely transmission housing 55. In an initial condition of clutch 20, prior to wear on friction surface 40 of driven member 36, retainer 54 moves a constant distance from the engaged position to the fully disengaged position of clutch 20. Similarly, pressure plate 34 moves a constant distance from an engaged position to a disengaged position. This distance of travel for pressure plate is approximately 0.040 inch (1.02 mm), assuming no wear on friction surface 40. Pin assembly 112 permits pressure plate to move freely this distance, due to clearance 124.

After wear has occurred on friction surface 40, pressure plate must move an additional axial distance to engage the clutch. This additional increment of travel is shown as "d" and indicated as reference numeral 138. In this intermediate condition of clutch 20, the axial movement of pressure plate exceeds the clearance 124 provided by pin assembly 112. Therefore, in order for pressure plate 34 to move the additional distance "d", pin housing 120 is moved an axial distance "d" relative to cover. Head 122 of pin 118 applies a force on a right end 138 of pin housing 120, as seen in FIG. 3. Pin housing 120 will then move axially to the left relative to cover 32 because the force of coil springs 56 exceeds the force of the interference fit between pin housing 120 and cover 32. The clutch 20 will continue to operate at this position, and will remain unadjusted until release assembly is moved to a fully disengaged position.

Due to pin assembly 112, pressure plate 34 is now spaced from an end of cover 32 by an additional distance "d", as seen in FIG. 7. The pre-adjusted position of cover 32 relative to pressure plate 34 is shown in phantom. The force of the interference fit between pin housing 120 and cover 32 is sufficient to prevent pin housing 120 from moving axially to the right with respect to cover 32. This is due to the relatively weak force which is applied for rightward movement of pressure plate. In contrast, the leftward force applied by coil springs 56 is much greater.

During adjustment, pressure plate 34 contacts a left end 140 of pin housing 120 when release assembly 28 is moved to the fully disengaged position. Pin housing 120 prevents further rightward movement of pressure plate. Strap 130 applies a leftward biasing force on adjusting ring 44 towards pressure plate 34. This biasing force moves adjusting ring 44 and left cam ring 46 to the left, creating gap "d". Gap "d" is created between left cam ring 46 and right cam ring 48.

In response to the gap "d," right cam ring 48 rotates with respect to left cam ring 46 causing camming between ramps 80 and 88. This camming action locks adjusting ring 44 into the position provided by lever 58. In so doing, an extreme left axial end of adjustment mechanism is moved from a first position to a second position, the second position being spaced a greater axial distance from cover 32 than the first position.

Figure 9A:
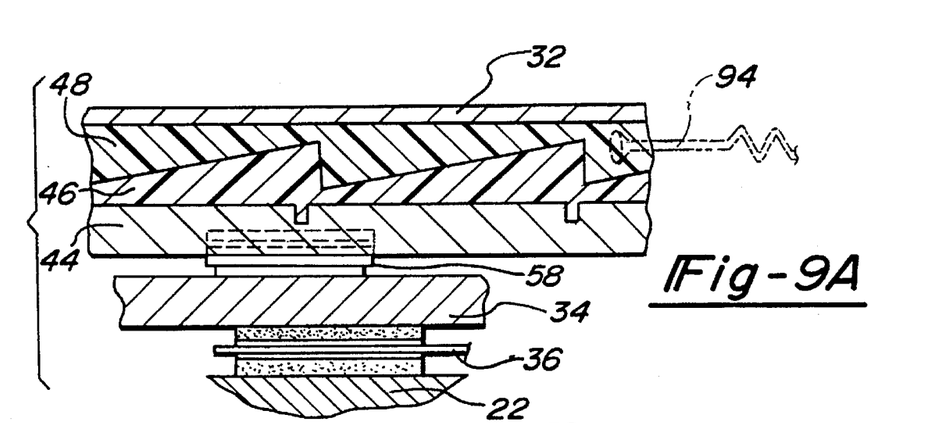
FIG. 9A is a partial radial cross-sectional view of the clutch shown in an engaged position.
Figure 9B:
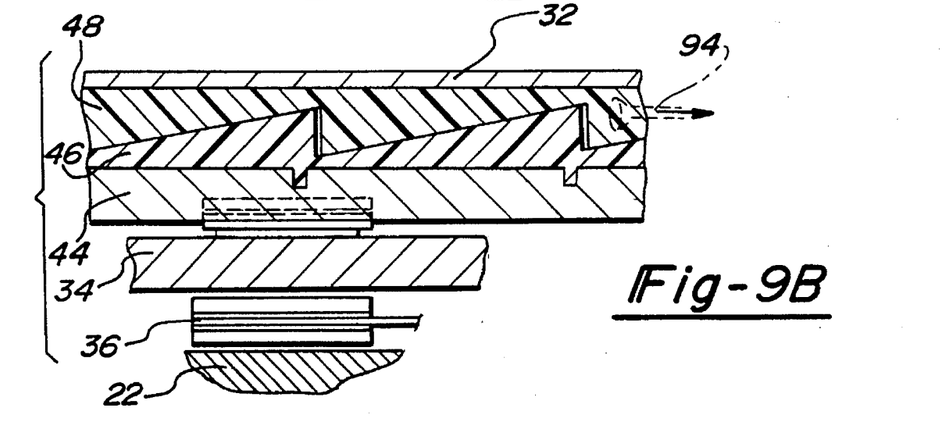
FIG. 9B is a partial radial cross-sectional view of the clutch shown in an intermediate disengaged position prior to adjustment.
Figure 9C:
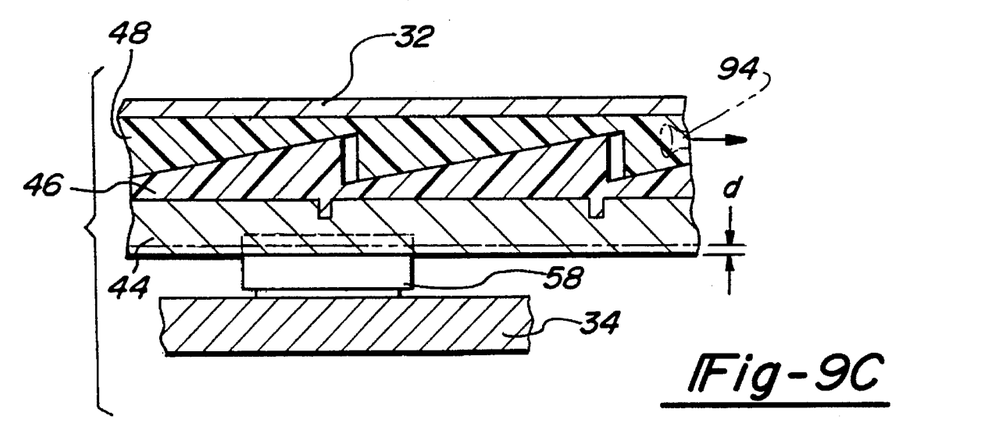
FIG. 9C is a partial radial cross-sectional view of the clutch shown in a fully disengaged position after adjustment.

Referring now to FIGS. 9A–9C, the camming action of adjustment mechanism 42 is illustrated from another cross-sectional view. Radial cross-sections of the relative position of the clutch members are shown before and after adjustment. The clutch is shown in an engaged position in FIG. 9A, after wear has occurred on friction surface 40 of driven member 36. Because of wear on friction surface 40, pressure plate has moved an additional axial distance in order to engage driven member 36 with flywheel 22.

The clutch is shown in an intermediate disengaged position in FIG. 9B. In this intermediate position, adjustment mechanism 42 has not yet been activated to adjust clutch 20 in response to the wear on friction surface 40. The clutch will operate unadjusted until it is fully disengaged.

Clutch 20 is shown in the fully disengaged position in FIG. 9C after adjustment. When clutch 20 is fully disengaged, pull assembly 52 of release assembly 28 contacts transmission housing 55, which is the extreme right position for release assembly 28, as shown in FIG. 3. The radially outer portion 64 of lever 58 leverages adjusting ring away from cover 32, and creates a gap between left cam ring 46 and right cam ring 48. The biasing forces on right cam ring 48 caused by spring 94 urges the rotation of right cam ring 48. This, in turn, results in camming along ramps 80 and 88 to increase the axial displacement of adjustment mechanism 42 to fill the gap.

This action repeats each time wear has occurred on friction surface 40, and when clutch 20 is fully disengaged.

Further, this adjustment action occurs automatically during normal operation of the clutch.

A second embodiment of the invention is illustrated in FIG. 10. An adjustment mechanism 142 is incorporated in a clutch 144 having a diaphragm spring 146. Clutch 144 transmits torque from a flywheel 148 to an axially extending driven shaft 150. A cover 152 is secured to flywheel 148 for rotation therewith. A pressure plate 154 and a driven member 156 are sandwiched between flywheel 148 and cover 152. Driven member 156 is secured to driven shaft 150 for rotation therewith. Driven member 156 includes friction surfaces 157. A retainer assembly 158 extends circumferentially about driven shaft 150. Diaphragm spring 146 is interposed between cover 152 and retainer assembly 158 to apply a leftward force on pressure plate 154. Diaphragm spring 146 acts against a fulcrum 160 to maintain clutch 144 in the engaged position. To disengage clutch 144, retainer assembly 158 is moved to the right. Clutch 144 automatically adjusts to wear on friction surfaces 152 of driven member 156 in a manner similar to that of clutch 20.

A pin 164 is received within an aperture 166 of pressure plate 154, forming an interference fit. Pin 164 includes a left end 167 and a right end 168. Left end 167 of pin 164 extends through an opening 170 in cover 152 to contact flywheel 148. Right end 168 contacts a radially extending flange 172 of cover 152. A clearance 174 is provided for pin 164 between flywheel 148 and flange 172 for axial movement of pressure plate. Clearance 174 is the axial movement required to engage and disengage clutch 144 assuming no wear on friction surfaces 157.

Adjustment mechanism 142 includes a cam ring 176 and a cam ring 178, each being recieved in an annular pocket 180 formed in pressure plate 154. Cam ring 176 is biased to rotate with respect to pressure plate 154 by a spring 182 received in an annular cavity 184 adjacent cam ring 178. Cam ring 178 includes fulcrum 160. Cam ring 178 is axially movable with respect to pressure plate 154, but is otherwise rotationally fixed to pressure plate 154. The ramped contacting surfaces of cam ring 176 and cam ring 178 are similar in dimension and shape as that described for cam rings 46 and 48. Rotation of cam ring 176 results in camming that moves cam ring 178 to the right.

A locking member 186 extends through an aperture 188 in diaphragm spring 146, to maintain fulcrum 160 in contact with diaphragm spring 146. Clutch 144 adjusts in a manner similar to that described for the first embodiment. Prior to wear on friction surface 162, the relative position of pin 164 with respect to pressure plate 154 remains unchanged due to clearance 174. If wear has occurred on friction surface 162, pin 164 will contact flywheel 148, and pressure plate will move an additional distance to the left. The leftward force on pressure plate provided by diaphragm spring 146 exceeds the force of the interference fit of pin 164 and pressure plate 154, thereby forcing pin 164 to slide within aperture 166 of pressure plate 154.

When retainer assembly 158 is moved to a fully disengaged position, which is at a fixed axial location with respect to flywheel 148, adjustment mechanism 142 is activated. Right end 168 of pin 164 contacts flange 172 of cover 152 preventing rightward movement of pressure plate 154. Again, the rightward force is not sufficient to overcome the interference fit of pin 164 and pressure plate 154. Locking member 186 is then able to pull cam ring 178 to the right because further rightward movement of pressure plate 154 is prohibited by pin 164. This action creates a gap between cam ring 176 and cam ring 178. As in the first embodiment, the ramped surfaces of the cam rings rotate with respect to each other to displace this gap. The camming action locks cam ring 178 in position, which maintains fulcrum 160 at a position which is axially spaced from the pressure plate an additional increment.

Numerous advantages are achieved by the use of a clutch having the inventive automatic adjustment mechanism as described. The adjustment of the clutch is automatically set each time the clutch is fully disengaged. The adjustment is a direct function of increased movement of the pressure plate due to wear on friction surfaces, which is triggered by a pin or pin assembly that cooperates with the pressure plate. The increment of wear on the friction surface of driven member is directly translated into a gap between the annular cam rings, each having contacting camming surfaces. The annular cam rings cam against each other when the clutch is fully disengaged to displace this gap. Therefore, the clutch automatically adjusts over the life of the clutch and operates at peak efficiency. The adjustment mechanism is internal to the clutch, and therefore not subject to the external environment which could cause damage to the components.

The inventive clutch automatically compensates for wear on the mechanical linkage between clutch pedal 30 and release assembly 28. In addition the clutch will automatically set clutch brake squeeze and compensate for wear on the clutch brake throughout the life of the clutch.

The embodiment of FIGS. 1–9 includes the wear indicator tab so that an operator is aware of how much adjustment has taken place, and can estimate the remaining life of the clutch. This visual indicator is outside the clutch, and provides this information without disassembly of the clutch. Further, the adjustment mechanism compensates for manufacturing variations in the cover assembly allowing the clutch to be initialized upon the first full disengagement.

Further, in the first embodiments the set of straps which secure the pressure plate to the adjustment mechanism also maintains the lever against the pressure plate. Therefore, noise is reduced or eliminated due to vibration that may otherwise occur between the pressure plate and the lever. Further, wear on the pressure plate shoulder 74 is reduced due to the decreased vibration of lever 58.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

What is claimed is:

1. A friction torque device comprising:

a driving member having an axis of rotation;

a cover coupled to said driving member for rotation with said driving member;

a pressure plate coupled to said cover for rotation with said cover;

an axially extending driven shaft;

a driven member coupled to said driven shaft for rotation with said driven shaft, said driven member interposed between said driving member and said pressure plate;

a friction surface associated with said driven member, said friction surface engaging said driving member for transmitting torque from said driving member to said driven member;

a release assembly extending about said driven shaft;

an annular first member of an adjustment mechanism extending about said axis at a radially outer position with respect to said release assembly, said annular first member being coupled to said cover for rotation with said cover;

an annular second member of the adjustment mechanism adjacent to and contacting said first member, said second member having a cam surface in contact with said first member, wherein when said second member rotates with respect to said first member, said second member cams against said first member to move an axial end of one of said first member and said second member from a first axial position to a second axial position relative to said cover;

an elongated biasing member received radially inwardly of said second member, said biasing member having a first end and a second end, said first end of said biasing member being received in said second member and said second end of said biasing member being received in a bracket attached to said cover, said bracket including an outwardly extending arm, said bracket and said arm maintaining said biasing member in a curved orientation wherein said second member is biased to rotate with respect to said first member by said elongated biasing member; and a radially extending lever member interposed between said release assembly and said adjustment mechanism, said lever member being coupled to an axial end of said adjustment mechanism, said lever member cooperating with said axial end of said adjustment mechanism and said release assembly to move said pressure plate to engage and disengage said driven member and said driving member, said axial end of said adjustment mechanism being at a first position relative to said cover prior to wear on said friction surface, said lever member further cooperating with said adjustment mechanism to move said axial end of said adjustment mechanism to a second position relative to said cover after wear has occurred on said friction surface, said second position being axially spaced from said first position.

2. A friction device comprising:

a driving member having an axis of rotation;

a cover coupled to said driving member for rotation with said driving member;

a pressure plate coupled to said cover for rotation with said cover;

an axially extending driven shaft;

a driven member coupled to said driven shaft for rotation with said driven shaft, said driven member interposed between said driving member and said pressure plate;

a friction surface associated with said driven member, said friction torque surface engaging said driving member for transmitting torque from said driving member to said driven member;

a release assembly extending about said driven shaft;

an adjustment mechanism, a portion of which is coupled to said cover for rotation with said cover, said adjustment mechanism being at a radially outer position with respect to said release assembly;

a generally circumferentially extending first strap having an end attached to said pressure plate and an end attached to said cover, said first strap being sufficiently flexible to allow limited axial movement of said pressure plate with respect to said cover and being sufficiently field to rotationally fix said pressure plate to said cover;

a generally circumferentially extending second strap securing said adjustment mechanism to said pressure plate, said second strap having an end attached to said adjustment mechanism and having an end attached to said pressure plate, said second strap being sufficiently flexible to allow limited axial movement of said adjustment mechanism with respect to said pressure plate and being sufficiently rigid to rotationally fix said adjustment mechanism to said pressure plate; and a radially extending lever member interposed between said release assembly and said adjustment mechanism, said lever member being coupled to an axial end of said adjustment mechanism, said lever member cooperating with said axial end of said adjustment mechanism and said release assembly to move said pressure plate to engage and disengage said driven member and said driving member, said axial end of said adjustment mechanism being at a first position relative to said cover prior to wear on said friction surface, said lever member further cooperating With said adjustment mechanism to move said axial end of said adjustment mechanism to a second position relative to said cover after wear has occurred on said friction surface, said second position being axially spaced from said first position.

3. A friction torque device comprising:

a driving member having an axis of rotation;

a cover coupled to said driving member for rotation with said driving member;

a pressure plate coupled to said cover for rotation with said cover;

an axially extending driven shaft;

a driven member coupled to said driven shaft for rotation with said driven shaft, said driven member interposed between said driving member and said pressure plate;

a friction surface associated with said driven member, said friction surface engaging said driving member for transmitting torque from said driving member to said driven member;

a release assembly extending about said driven shaft;

an adjustment mechanism, a portion of which is coupled to said cover for rotation for said cover, said adjustment mechanism being at a radially outer position with respect to said release assembly;

a biasing element of said adjustment mechanism disposed between said pressure plate and said portion of said adjustment mechanism coupled to said cover, said biasing element biasing said portion of said adjustment mechanism away from said cover; and a radially extending lever member interposed between said release assembly and said adjustment mechanism, said lever member being coupled to an axial end of said adjustment mechanism, said lever member cooperating with said axial end of said adjustment mechanism and said release assembly to move said pressure plate to engage and disengage said driven member and said driving member, said axial end of said adjustment mechanism being at a first position relative to said cover prior to wear on said friction surface, said lever member further cooperating with said adjustment mechanism to move said axial end of said adjustment mechanism to a second position relative to said cover after wear has occurred on said friction surface, said second position being axially spaced from said first position.

* * * * *

UNITED STATES PATENT AND TRADEMARK OFFICE
CERTIFICATE OF CORRECTION

PATENT NO. : 5,566,804
DATED : 10/22/96
INVENTOR(S) : Gochenour et al

It is certified that error appears in the above-indentified patent and that said Letters Patent is hereby corrected as shown below:

Column 11, line 1, delete "field" and substitute therefor --rigid--

Column 11, line 22, delete "With" and substitute therefor --with--

Signed and Sealed this

Seventh Day of January, 1997

Attest:

BRUCE LEHMAN

Attesting Officer     Commissioner of Patents and Trademarks